United States Patent

[11] 3,602,698

[72] Inventor Hervey E. Vigour
Waynesboro, Va.
[21] Appl. No. 737,461
[22] Filed June 17, 1968
[45] Patented Aug. 31, 1971
[73] Assignee General Electric Company

[54] PULSE COUNT CONVERSION DEVICE USING DECIMAL ADDER-SUBTRACTER
6 Claims, 4 Drawing Figs.

[52] U.S. Cl. .......... 235/92 EV, 235/92 R, 235/92 V, 235/92 GC, 235/92 PL, 340/347 DD
[51] Int. Cl. .......... G06m 1/272, G06m 3/14
[50] Field of Search .......... 235/92

[56] References Cited
UNITED STATES PATENTS

| | | | |
|---|---|---|---|
| 2,918,215 | 12/1959 | Root | 235/92 |
| 3,084,285 | 4/1963 | Bell | 328/34 |

*Primary Examiner*—Maynard R. Wilbur
*Assistant Examiner*—Robert F. Gnuse
*Attorneys*—William S. Wolf, Gerald R. Woods, Frank L. Neuhauser, Oscar B. Waddell and Joseph B. Forman

ABSTRACT: A conversion device for converting a train of electric signal pulses indicative of a given quantity, such as position, into a count of standard units of measure. The conversion device comprises a digitally operable, reversible counter and register having digitally operable adder-subtracter circuit means for adding positive or negative increments of count to the register for each input electric signal pulse as determined by the sign of the input electric signal pulses. The overflow from the register is applied to a reversible counter. Each increment of count is proportional to a standard conversion factor for converting the input train of pulses into a count of standard measurement units such as inches or centimeters. The reversible counter preferably comprises a digital decimal counter. The stages of the register are preferably comprised by binary arithmetic stages and the most significant binary stage supplied its overflow count to the least significant decimal stage of the counter as a standard decimal incremental input. The train of input pulses indicative of a quantity to be measured may comprise the output signal pulses of an interferometer position measuring device, and the standard conversion factor added to or subtracted from the reversible counter for each incremental input pulse may be a value representative of the spacing in microinches or micrometers between the fringe count pulses produced by the interferometer position measuring device.

PATENTED AUG 31 1971 3,602,698

SHEET 1 OF 2

INVENTOR.
HERVEY E. VIGOUR
BY *Michael Masnik*
HIS ATTORNEY (c)

| A | B | Q |
|---|---|---|
| 0 | 0 | 1 |
| 0 | 1 | 0 |
| 1 | 0 | 0 |
| 1 | 1 | 0 |

INVENTOR.
HERVEY E. VIGOUR
BY *Michael Masnik*
HIS ATTORNEY

PULSE COUNT CONVERSION DEVICE USING DECIMAL ADDER-SUBTRACTER

BACKGROUND OF THE INVENTION

1. Field of Invention

This invention relates to a pulse count conversion device using a decimal adder-subtracter type of conversion apparatus formed by a combination reversible counter and register for converting an input train of electric signal pulses indicative of a quantity (such as position) to be measured into a count of standard measurement units.

More particularly, the invention relates to a conversion device having the above characteristics for use in converting the nonstandard output fringe count signal pulses of an interferometer position-measuring device into a count of standard measurement units by adding or subtracting one incremental conversion factor value to the contents of a reversible counter and register in response to input direction indicating, variable rate, fringe count signal pulses supplied from the interferometer position-gauging device.

2. Description of Prior Art

A digitally operable quantity (position) measuring and conversion apparatus comprised by an interferometer position-measuring device and associated conversion circuitry, is disclosed in U.S. Pat. application Ser. No. 709,387—L. U. C. Kelling, inventor, entitled "Conversion Apparatus for Converting Nonstandard Pulse Count to Standard Measurement Count"—filed Feb. 29, 1968 and Ser. No. 709,433—L. U. C. Kelling, inventor, entitled "Numerical Conversion Apparatus for Interferometer Position Transducer"—filed Feb. 29, 1968, and assigned to the General Electric Company. The apparatus disclosed in the Kelling applications comprises an interferometer position-measuring device that develops a number of variable rate direction indicating, fringe count pulse waveform electric signals which are representative of the position of an equipment (such as the working head of a numerically controlled machine tool) being controlled with respect to a reference position. For a more detailed description of the interferometer position-measuring device and the manner of its operation to derive the variable rate, direction indicating fringe count pulse waveform electric signal, reference is made to the above-mentioned Kelling applications.

The measuring and conversion apparatus disclosed in the first-mentioned Kelling application employs a pulse rate multiplier type of digitally operable numerical processing apparatus for converting the fringe count signal pulses from the interferometer position-measuring device into a count of standard measurement units. The present invention relates to a conversion device of the decimal adder-subtracter type and which employs a reversible counter and register to derive the desired output count in standard measurement units. With the arrangement made available by the invention, certain small but nevertheless significant nonaccumulative computational errors can be avoided.

SUMMARY OF THE INVENTION

It is therefore a primary object of the present invention to provide a new and improved conversion device using a decimal adder-subtracter type of conversion apparatus for converting a train of quantity (position) indicating electric signal pulses into a count of standard measurement units.

Another object of the invention is to provide a conversion device of the above type which employs a combination reversible counter and register as the conversion apparatus.

A still further object of the invention is the provision of a conversion device having the above characteristics for use in processing the output fringe count pulses of an interferometer position-measuring device.

Another object of this invention is to provide an improved signal-processing arrangement.

In practicing the invention a conversion device is provided for converting a train of pulses which are indicative of a given quantity (such as position) into a count of standard units of measure. The conversion device comprises a digitally operable, reversible counter, and register, with an adder-subtracter circuit means coupled to the register for adding positive or negative increments of count to the register as determined by the sign of the input pulses supplied thereto. The overflow from the register is applied to the counter. Each increment of count is proportional to a standard conversion factor for converting the incoming train of pulses into a count of standard units of measure. The reversible counter preferably is a decimal reversible counter and wherein the stages of the register are comprised by binary arithmetic stages and wherein the most significant binary stage of the register supplies its overflow count to the least significant decimal stage of the counter as a known decimal incremental input.

In a preferred embodiment of the invention, the train of pulses indicative of a quantity to be measured (such as position), comprises the output fringe count signal pulses of an interferometer position-measuring device and the standard conversion factor is a value proportional to the spacing between the fringes represented by the fringe count pulses. In this preferred embodiment, means are also provided for varying the value of the conversion factor in accordance with changes in the environmental conditions affecting the spacing between the interferometer fringe.

BRIEF DESCRIPTION OF THE DRAWINGS

Other objects, features and many of the attendant advantages of this invention will be appreciated more readily as the same becomes better understood by reference to the following detailed description, when considered in connection with the accompanying drawings, wherein like parts of each of the several figures are identified by the same reference character, and wherein.

DETAILED DESCRIPTION OF THE PREFERRED EMBODIMENT

Figure 1:
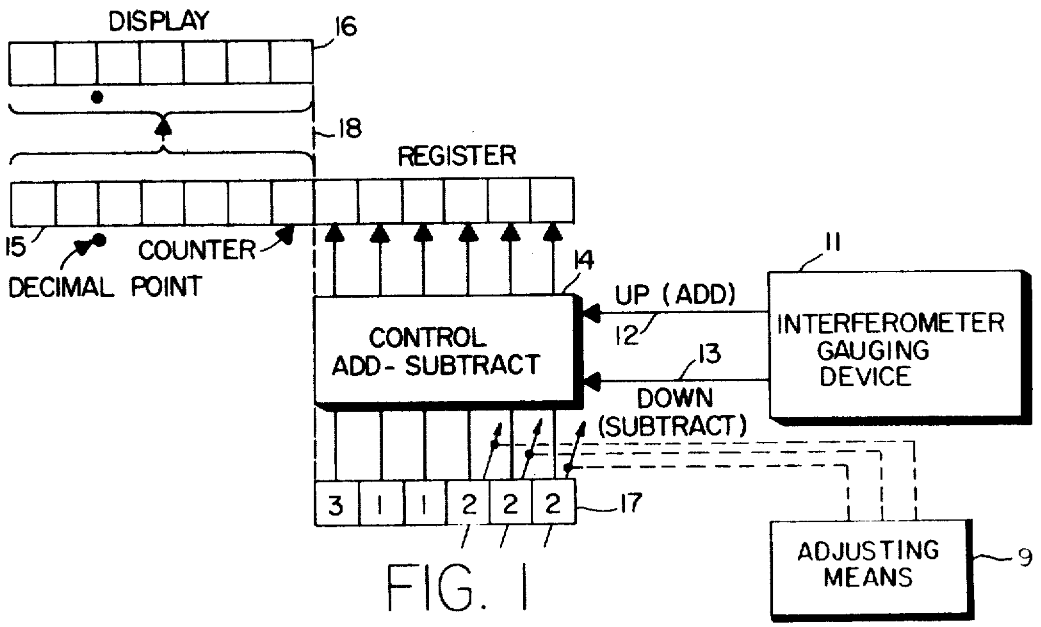
FIG. 1 is a functional block diagram of one form of a decimal adder-subtracter type of conversion device constructed in accordance with the invention.

A numerically controlled machine tool is an automatically controlled machine tool that employs digitized electronic signals to control the action of the working head (cutting element) relative to the workpiece in order to describe a contoured or complicated cutting path on the workpiece. For a more detailed description of numerically controlled machine tools, reference is made to the published literature such as U.S. Pat. No. 3,120,603, issued Feb. 4, 1964, for an "Automatic Control Apparatus," and assigned to the General Electric Company. The known numerically controlled machine tools heretofore have employed as position feedback signal generating devices, position-measuring devices of either the resolver or Accupin type which provide phase shifted, square wave shaped electric signals representative of the position of the working head of the machine tool. While such position-measuring units are adequate for many applications, there are a number of machine tool jobs wherein the tolerances allowed are much too close to employ a resolver or Accupin type of position-measuring unit. Because of this need, it has been proposed to employ an interferometer position-measuring device for developing extremely accurate, digitized position feedback signals for precisely locating the position of the working head of the machine tool. A machine operation in question may be either contouring, or distance machining to a point in space (such as is encountered in drill press operation, etc.) wherein it is desired to know within microinches (0.000001 inch), or perhaps fractions of a microinch, the precise location of the working head of the machine tool. An interferometer position-measuring device provides such precise position locating information within the required accuracy.

The position-measuring signal derived by an interferometer position-measuring device, is developed through the use of a coherent light wave interference phenomenon wherein changes in the position of the working head of the machine result in changing the number of interference fringes produced at a detecting location due to the interaction of out-of-phase reflected and reference coherent light waves impinging on a detector disposed at the detecting location. As the working head of the machine tool changes location in response to numerical command signals supplied to it, the phase of the coherent light wave produced by the laser interferometer and reflected from the working head so as to impinge on the detector, changes relative to a reference coherent light wave (produced by the same laser) to thereby produce interference fringe count signal pulses at the output of the detector. These fringe count signal pulses are indicative of extremely small changes in position of the machine tool working head.

The character of the fringe count signal pulses appearing at the output of the interferometer position-measuring device, is such that movement of the working head in one direction (measured along a defined axis) relative to a reference position produces one characteristic form of phase change interference fringe count pulse that is different from the characteristic form of phase change interference fringe count pulse produced for movement in an opposite direction relative to the reference position. Hence, the characteristic interference fringe count signal pulses can be used to indicate up-down or positive-negative movement or direction of the working head of the machine tool relative to the reference position. Hence, it can be said that the fringe count signal pulses have a direction-indicating characteristic.

In addition to the above-mentioned direction-indicating characteristic, fringe count signal pulses produced by an interferometer position-measuring device are of a variable rate and the spacing between the fringes (while constant for steady state environmental operating conditions) is in the form of a count number that must be related to standard measurement units. For example, if it is determined that for a given set of ambient operating conditions, the spacing between the fringes produced by the interferometer is some number like 0.00001267421988 inch, then the fringe count produced by the interferometer must be multiplied by this factor (or a similar factor for operation in the metric system) in order to convert the count into meaningful units of distance measurements such as inches or centimeters. To accomplish this measurement and conversion in an improved manner, the present invention was devised.

In addition for the above need for conversion into standard measurement units, it should be noted that the spacing between the fringes produced by the interferometer position-measuring device (while constant for steady state ambient operating conditions) may be subject to change due to changes in the ambient operating conditions of the interferometer measuring device. To be particular, suppose that the laser interferometer device employs a laser that puts out light having a full wave length equal to 0.00001267421988 inch. Depending upon the accuracy desired, the conversion apparatus of the invention can be made with a sufficient number of digits to get the required accuracy out to 10 or 12 decimal places. Normally, however, six or seven digits are sufficient to obtain an accuracy of approximately one part in 100,000. If seven digits are used, then in effect the conversion apparatus will function to multiply each incoming laser interferometer fringe count pulse by a conversion factor of $12.67422\times10^{16}$ inches to derive a desired output position count representative of the position of the working element of the machine tool in standard measurement units. However, the wavelength of light in air changes slightly with changes in environmental factors, such as air pressure, temperature and humidity, etc. Thus, the last three digits of the conversion factor employed must be readjusted as local environmental conditions change. The conversion device made available by the present invention also includes means for changing the value of the least significant digits of the conversion factor employed to convert the fringe count signal pulses to an output count of standard measurement units.

While the conversion device described herein is intended primarily for use in the conversion of fringe count signal pulses of an interferometer position-measuring device, it may be employed in connection with any general conversion problem encountered by numerically controlled equipment wherein the term "numerically controlled equipment" is intended to include any digitally operable, numerically controlled apparatus, such as an inspection machine, machine tool readout for display, sensor or guidance control systems employing digitized signals, machine tool controls, and the like.

FIG. 1 is a functional block diagram of a conversion device constructed in accordance with the invention. In FIG. 1 an interferometer gauging device is shown at 11 which has two outputs shown at 12 and 13 connected to supply up (add) and down (subtract) direction indicating, variable rate, fringe count electric signal pulses to a control add-subtract circuit means 14. The control add-subtract circuit means 14 has its output supplied to the least significant stages of a register 15 such as a series of flip-flop circuits. In addition to the add and subtract pulses supplied from 12 and 13, the control add-subtract circuit means 14 has supplied thereto from a suitable register 17, additional inputs representative of the conversion factor which is to be added or subtracted to the register 15 for each input fringe count pulse. If desired, means may be provided for adjusting the additional inputs from register 17 in accordance with the variation in certain ancillary factors (such as variations in temperature, pressure, humidity, etc.) that affect the spacing represented by the fringe count signal pulses produced by interferometer gauging device 11. This adjustability is represented in FIG. 1 by arrows assigned to the last three digit positions, and control of adjustment (arrow position) is shown by dotted line connection to an adjusting means 9.

As stated earlier, the input to control add-subtract circuit means 14 consists of "count up" or "count down" pulses originating from the bidirectional sensing of optical interference fringes produced by the laser interferometer gauging device 11. Numerical conversion is required because the mechanical displacement corresponding to one fringe is incommensurate with standard measurement units. The register 15 represents a decimal register in which each stage stores a decimal digit. For convenience, the register depicted is shown to have a storage capacity of 99.99+ inches, although the capacity readily could be increased to 999.99+, etc., by adding additional stages. A sufficient number of decimal places should be employed to accommodate all of the significant figures resulting from the conversion operation. In the example shown in FIG. 1, 11 places to the right of the decimal point are shown in order to accommodate an assumed conversion quantity of $3.11222\times10^{16}$ inches, but more stages could be added if required. The interferometer gauging device 11 may be adjusted to supply a fringe count output signal pulse for each whole fringe, or alternately, in order to improve resolution, it may be adjusted to supply an output fringe count pulse for either a half or a quarter fringe. In the following description, it will be assumed that a fringe count signal pulse is produced for each quarter fringe wherein the spacing represented between each fringe count signal pulse is $3.11222\times10^{16}$ inches. If a pulse were produced for every half fringe, then the spacing between pulses would be double this value, etc.

During operation, for upscale motion, each time a quarter fringe is detected by the interferometer gauging device 11, a quantity equal to $3.11222\times10^{6}$ inches is arithmetically added to the contents of the decimal register 15. Starting from an arbitrary position which is defined to be the reference position where the register was cleared to zero, the total displacement of the machine head will be stored in the register as a consequence of this action. If desired, the contents may be displayed to a convenient number of decimal places, such as the nearest ten-millionths of an inch, by appropriate connection to the display 16. For down-scale motion, the quarter-fringe conversion quantity ($3.11222\times10^{6}$) is subtracted out of the register 15 each time a quarter fringe is detected. Thus, the contents of the register 15 are continuously readjusted in response to the input up and down pulses supplied from interferometer gauging device 11 over conductors 12 and 13 to the control add-subtract circuit 14. The net value accumulated at any instant of time in the reversible counter 15 and displayed on display 16, will then be indicative of the instantaneous position of the machine tool head.

Since the number stored in the left portion of register 15 is changed by only one incremental conversion unit at a time applied to the least significant state (digit), the portion of the register to the left of the dotted vertical line 18 (which portion includes the first five figures after the decimal point) may comprise a reversible counter that consists of conventional binary-coded, count-up decade counters of the type shown in FIG. 21 of the above-identified U.S. Pat. No. 3,120,603. Binary operation of the right portion of register 15 permits much faster operation, and hence the embodiment of the invention shown in FIG. 2 is preferred.

Figure 2:
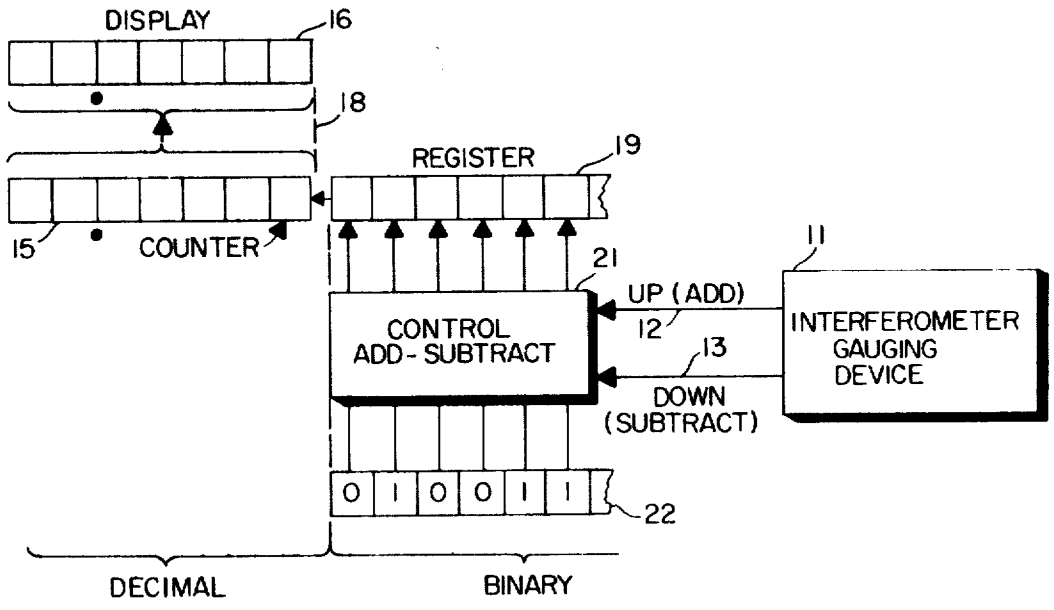
FIG. 2 is a functional block diagram of a preferred form of conversion device constructed in accordance with the invention and which employs a combination decimal-binary reversible counter.

Referring to FIG. 2, it will be seen that the register 19 is comprised by a plurality of binary stages. A capacity of 20 bits for the binary stages 19 would provide resolution slightly better than that required for six decimal digits. The control add-subtract circuit means 21 serves to add (or subtract) the conversion quantity internally in the form of a binary number for each fringe count signal pulse supplied thereto over leads 12 and 13 from the interferometer gauging device 11. The conversion quantity is supplied from a register 22 as a binary fraction of ten-millionths of an inch. That is, the most significant binary signal from 22 is dimensioned to be one-half of the value of the least significant decimal number stage, i.e., ten-millionths, of counter 15. The register 22 may comprise a series of handset switches combined with permanent connections to voltages buses for the more significant digits, another binary counter which can be set by such switches, or it may comprise in part the output from sensors supplying automatic corrections for pressure, temperature, humidity, etc., which affect the spacing of the fringes, and hence the quantity represented by each fringe count pulse produced by interferometer gauging device 11. The most significant bit in the binary register 19 is assigned a value of one-half of ten-millionths, the next most significant bit a value of one-fourth of ten-millionths, etc., so that an arithmetic carry (or borrow) generated in the most significant binary bit and supplied to the least significant digit in the decimal portion 15 of the reversible counter, represents 10 microinches. This carry (or borrow) is applied to the decimal counter 15 as a count-up (or count-down) signal. By using the combined decimal-binary construction shown in FIG. 2, faster operation can be obtained from the binary circuit portions which are changed most frequently since they are employed to represent the least significant digits in the accumulated count. Binary operation permits a complete addition or subtraction to be made more rapidly than for a complete addition or subtraction using decimal circuitry.

Figure 3:
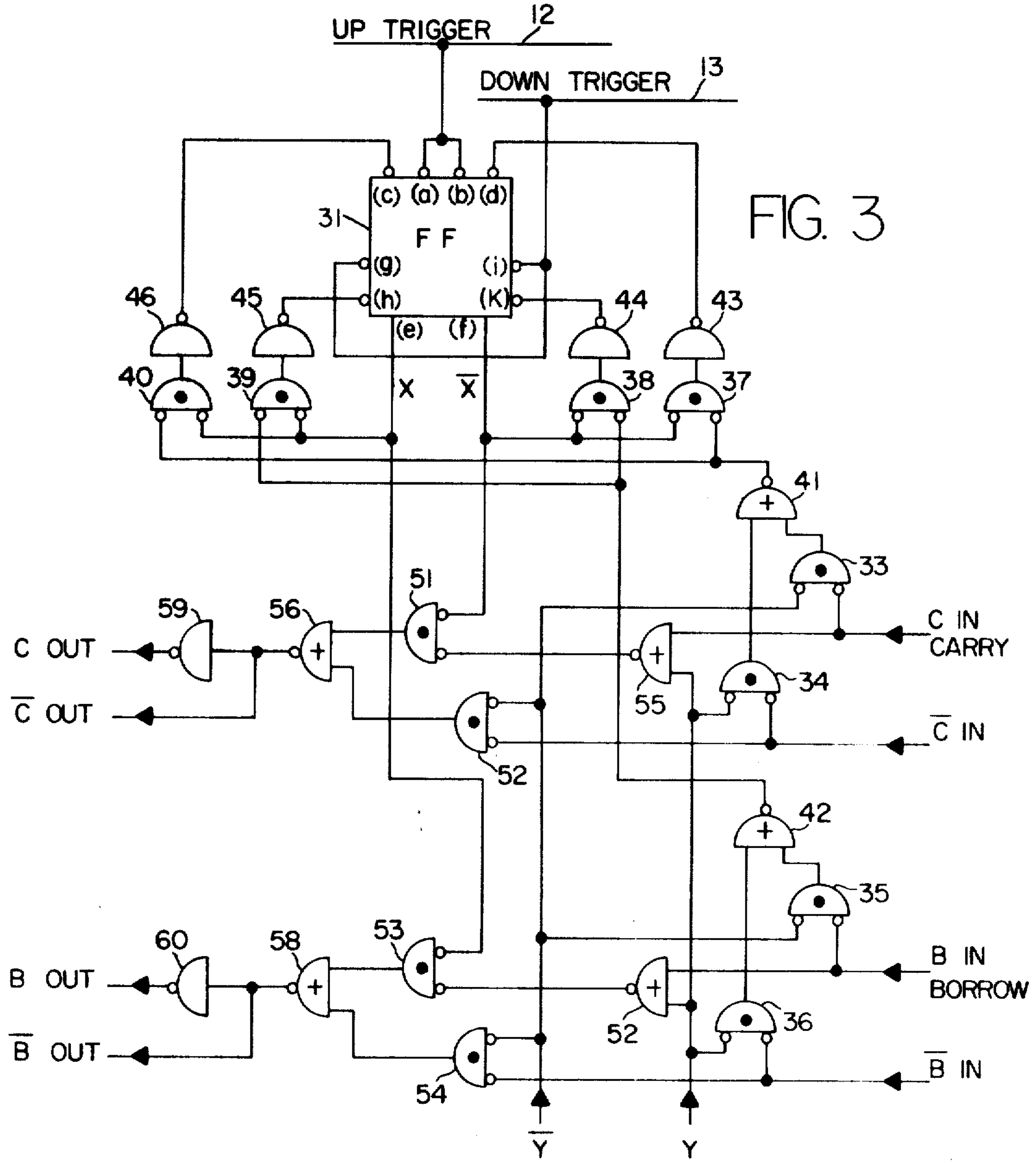
FIG. 3 is a detailed logical circuit diagram of one stage of a binary stage employed in the least significant portions of the conversion device shown schematically in FIG. 2 of the drawings.

FIG. 3 of the drawings is a detailed logical circuit diagram of the construction of one of the binary stages of the conversion device shown schematically in FIG. 2, and which is designed for use as one of the stages of lesser significance so that means are provided for changing the value of the conversion constant digit with which this stage operates. The manner in which the several stages such as shown in FIG. 3 can be combined with the decimal portion of a reversible counter such as that shown in FIG. 13 of U.S. Pat. No. 3,120,603, is believed to be obvious to one skilled in the art. Should it be desired, with respect to the more significant binary stages wherein changes in the conversion quantity (for pressure, temperature corrections, etc.) will not affect the value of Y, such stages may be wired directly to a constant voltage service with a consequent saving of about eight gates per stage through proper design for appropriate fixed values of Y.

The circuit shown in FIG. 3 receives as its input signals, the digit Y (which is either a 0 or 1) from the conversion quantity input register 22 in the form of Y and $\overline{Y}$ binary signals at the points indicated. The circuit also receives as inputs the borrow signal $B_{in}$ and $\overline{B_{in}}$ as well as a carry signal $C_{in}$ and $\overline{C_{in}}$ from the next less significant stage to the right.

The heart of the binary register stage shown in FIG. 3 of the drawings is comprised by a flip-flop logic circuit means 31 which comprises a "memory" element because of its ability to retain its state until it receives a signal to change state. Flip-flop 31 may be of conventional construction, and may be of the type shown in and described with relation to FIG. 4A of the above-identified U.S. Pat. No. 3,120,603. For a more detailed description of the construction and operation of the flip-flop 31, reference is made to the above-identified patent, or to any of the standard texts on the design of logical circuits such as the textbook entitled "Logical Design of Digital Computers" by Montgomery Phister—John Wiley Publishing Company, or the text entitled "Design of Transistorized Circuits for Digital Computers" by Abraham I. Pressman—John F. Ryder Publishing Company, Inc. of New York.

Briefly, however, the flip-flop 31 has a set trigger terminal (*a*) and a reset trigger terminal (*b*) connected in common to the conductor 12 which supplies the "count-up" signals from the interferometer gauging device 11. The flip-flop further includes a set steering terminal (*c*), a reset steering terminal (*d*), a set output terminal (*e*), a reset output terminal (*f*) and first and second set electronic input terminals (*g*) and (*h*), and first and second electronic input reset terminals (*i*) and (*k*). Terminals (*g*) and (*i*) are connected to input "subtract" conductor 13. The flip-flop can be set through the use of its electronic set input terminals (*g*) and (*h*) simultaneously, or through the use of the combination of set steering input (*c*) and its subsequent set trigger input (*a*). Hence it is called a "steered" flip-flop. Flip-flop 31 can be reset through the use of its electronic reset input terminals (*i*) and ( *k*) simultaneously, or through the combination of its steering input (*d*) and its subsequent reset trigger input (*b*). If the flip-flop 31 is in its reset condition, it can be set by applying a steering signal (which is a logic 0) to its set steering input (*c*), followed by a trigger input to its set trigger input terminal (*a*). Ordinarily, the steering is applied in advance of the time of application of the trigger. The trigger to the flip-flop is a positive-going pulse, a pulse going from a logic "1" to a logic "0."

The logic value or state "0" as used hereinafter implies that a positive voltage is present on the indicated lead, and conversely the logic value "1" implies that a zero of reference voltage is present on the indicated lead. This notation is consistent with the practice described more fully in the text on logic switching and design by Keister, Ritchie and Washburn entitled "The Design of Switching Circuits" published by D. Van Nostrand and Company, publishers.

Figure 4:
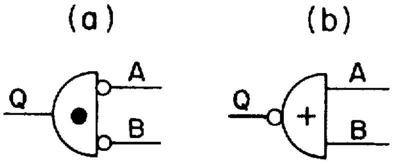
FIGS. 4A–4C illustrate the operation of the NAND gates and NOR gates shown in FIG. 3.

The flip-flop also may be switched from its set to its reset condition, or vice versa by application of a logic "1" signal to its electronic set input, or its electronic reset input, respectively. In the circuit arrangement shown in FIG. 3, the inputs Y, B and C are combined logically with the state X of flip-flop 31 to determine in which one of its two operating states "0" or "1" it will be placed. For this purpose, an input network of interconnected NOT-AND and OR-NOT logic circuits are provided for supplying to the steering input terminals of the flip-flop 31, input signals representative of the value of the conversion factor to be added or subtracted at the stage together with any carry or borrow value to be processed from adjacent stages. The input network is comprised by a plurality of NOT-AND gates 33 through 40 interconnected with a pair of OR-NOT gates 41 and 42, and a plurality of inverter gates 43–46. The NOT-AND gates (hereinafter called NAND gates) are all identical in construction, and operate in accordance with the convention indicated in the diagram shown in FIG. 4(*a*). FIG. 4(*a*) should be considered in conjunction with the truth table shown in FIG. 4(*c*). Similarly, the OR-NOT gate (hereinafter called NOR gates) are conventional in construction and operate in accordance with convention depicted in FIG. 4(*b*) considered in conjunction with the truth table shown in FIG. 4(*c*). It will be noted that both the NAND and the NOR gates have the same truth table insofar as their operation is concerned.

The circuit of FIG. 3 is completed by an output network of interconnected NAND gates 51–54, NOR gates 55–58 and inverter gates 59 and 60. The output network of interconnected NAND and NOR gates operate to derive an output carry or borrow value signal for supply to the next adjacent more significant stage through the inverter gates which merely operate to invert the signals from a binary "1" to a binary "0" or vice versa.

In operation, a value of logic "1" for the borrow ($B_{in}$) or the carry ($C_{in}$) indicates that borrowing or carrying is required in the next addition (or subtraction) to be carried out in connection with the stage in question upon application of the next trigger pulse. Count-up trigger pulses are supplied over the conductor 12 to the input trigger terminals (*a*) and (*b*) and negative going or count-down trigger pulses are supplied over the conductor 13 to both the set and reset electronic input terminals (*g*) and (*i*). To switch the flip-flop 31 from one condition to the other, it is necessary that both of the electronic input terminals such as (*g*) and (*h*), or (*i*) and (*k*), be simultaneously enabled or both the set or reset trigger and steering input terminals be enabled. With the circuit thus conditioned, the inputs Y, B and C are combined logically with the state X of flip-flop 31 to provide the flip-flop steering signals back through the NAND gates 37 through 40 and inverters 43 through 46 to control which state the flip-flop 31 is switched to.

The signals Y, B, C and X also are combined to provide the borrow ($B_{out}$ and $B_{out}$) and carry ($C_{out}$ and $C_{out}$) signals for the next more significant stage to the left of the stage in question. A count-up trigger signal pulse supplied over conductor 12, will be applied simultaneously to all binary stage flip-flops, such as 31, comprising the register and will cause the conversion quantity to be added into the binary register. A count-down trigger signal applied over conductor 13 will cause the conversion quantity to be subtracted out of the binary register formed by the flip-flops 31 comprising all of the binary stages.

During the addition operation, the steering logic is such that the flip-flop 31 changes stage if either Y or C (but not both) is a logic "1." A carry ($C_{out}$) into the next more significant stage will be generated if X is a "1" and either Y or C (or both) is a logic "1." Hence, it will be appreciated that if Y and C are both logic "1," there will be a carry ($C_{out}$) whatever the value of X may be.

During the subtraction operation, the logic involved is similar. The state of the flip-flop 31 will be changed if either Y or B (but not both) is a logic "1." A borrow ($B_{out}$) from the next more significant stage is required if X is a logic "0" and either Y or B (or both) is a logic "1." If Y and B are both logic "1,"there will be a borrow whatever the value of X may be.

As shown in FIG. 2, the borrow and carry signals generated in the most significant binary stage, such as that shown in FIG. 3, are connected to the input of the least significant stage of the reversible decimal counter as its count-down and count-up gate signals, respectively. When present, these output borrow and carry signals cause the decimal counter to count up (or down) by ten ten-millionths of an inch upon a count-up (or down) trigger pulse being supplied across the input trigger supply terminals 12 and 13. Since changes in the conversion quantity (due to changes in pressure, temperature, humidity, etc.) will not affect the value of Y in the more significant binary stages, such stages may be designed for an appropriate fixed value of Y through direct connection to a voltage bus with a consequent saving of approximately eight gates per stage. Redesign of the circuit shown in FIG. 3 to provide a fixed value of Y is believed to be obvious to one skilled in the art.

From the foregoing description, it will be appreciated that the present invention provides a new and improved conversion device using a decimal adder-subtractor type of conversion apparatus for converting a train of quantity (position) indicating electrical signal pulses into a count of standard measurement units. The conversion device in a preferred embodiment of the invention employs a combination, decimal-binary reversible counter as the conversion apparatus, and makes it possible to continuously adjust the value of the conversion factor being added into the reversible counter in response to each input add or subtract pulse. While the conversion device is intended primarily to process the output fringe count signal pulses of an interferometer position-measuring device, and the known conversion factor represents a value indicative of the spacing between the fringe count pulses produced by the interferometer position-measuring device, the conversion device is not restricted in its application to such use. On the contrary, the device may be applied to any general conversion problem wherein it is desired to convert variable rate signal pulses of irregular known spacing, into a count of standard measurement units.

Having described several embodiments of new and improved conversion devices constructed in accordance with the invention, it is believed that other modifications and variations of the present invention are possible in the light of the above teachings. It is therefore to be understood that changes may be made in the particular embodiments of the invention described which are within the full intended scope of the invention as defined by the appended claims.

What is claimed as new and desired to be secured by Letters Patent of the United States is:

1. A conversion device for converting a train of interferometer fringe count pulses indicative of a measurement in nonstandard units into a measurement in standard units comprising: a binary-coded decimal number reversible counter for storing decimal numbers in decimal number stages thereof, a binary-coded number register, a binary number adder-subtracter, a source of binary signals in parallel from representing the multidigits of a conversion factor number, the most significant binary signal of said source of binary signals being dimensioned to be one-half of the value of the least significant decimal number stage of said reversible counter, a source of a serial train of add and subtract pulses, said adder-subtracter responsive to said serial train of pulses and to said binary signals for adding in parallel to or subtracting in parallel from the number stored in said register the conversion factor number represented by said binary signals for each pulse in said train of pulses, said register dimensioned to supply its overflow count in series to the least significant decimal number stage of said counter as a decimal unit incremental input, said counter responsive to said supplied overflow counts for presenting the number represented by the algebraic summation of said pulses in said train in said standard units of measure.

2. An arrangement according to claim 1, further comprising means responsive to environmental factors affecting said interferometer for adjusting the value of at least some of said digits of said binary signals.

3. A conversion device for converting a train of interferometer fringe count pulses indicative of a measurement in nonstandard units into a measurement in standard units comprising: a binary-coded decimal number reversible counter for storing decimal digits in decimal number stages thereof, a given nondecimal coded number register, an adder-subtracter, a source of given nondecimal coded signals in parallel form representing the multidigits of a conversion factor number, the most significant given nondecimal signal of said source of signals being dimensioned to be one-half of the value of the least significant decimal number stage of said reversible counter, a source of a serial train of add and subtract pulses, said adder-subtracter responsive to said serial train of pulses and to said decimal signals for adding in parallel to or subtracting in parallel from the number stored in said register the conversion factor number represented by said decimal signals for each pulse in said train of pulses, said register dimensioned to supply its overflow count in series to the least significant decimal digit stage of said counter as a decimal unit incremental input, said counter responsive to said supplied overflow counts for presenting the number represented by the algebraic summation of said pulses in said train in said standard units of measure.

4. A conversion device for converting a train of pulses indicative of a measurement in nonstandard units into a measurement in standard units comprising: a binary-coded decimal number reversible counter for storing decimal digits in decimal stages thereof, a given nondecimal coded number register, an adder-subtracter, a source of multidigit signals in parallel form representing the multidigits of a conversion factor number, a source of a serial train of add and subtract pulses, said adder-subtracter having a plurality of binary stages, means for applying said train of pulses to only certain of the least significant stages of said adder-subtracter, means for applying said multidigit signals to the remaining binary stages of said adder-subtracter, said adder-subtracter responsive to said applied serial train of pulses and said applied signals for adding in parallel to or subtracting in parallel from the number stored in said register the conversion factor number represented by said signals for each pulse in said train of pulses, said register dimensioned to supply its overflow count in series to the least significant decimal stage of said counter as a decimal unit incremental input, said counter responsive to said supplied overflow counts for presenting the number represented by the algebraic summation of said pulses in said train in said standard units of measure.

5. A conversion device for converting a train of interferometer fringe count pulses indicative of a measurement in nonstandard units into a measurement in standard units comprising: a binary-coded decimal number reversible counter for storing decimal numbers in decimal number stages thereof, a binary-coded number register, a binary number adder-subtracter, a source of binary signals in parallel form representing the multidigits of a conversion factor number, a source of a serial train of add and subtract pulses, said adder-subtracter responsive to said serial train of pulses and to said binary signals for adding in parallel to or subtracting in parallel from the number stored in said register the conversion factor number represented by said binary signals for each pulse in said train of pulses, said register dimensioned to supply its overflow count in series to the least significant decimal number stage of said counter as a decimal unit incremental input, said counter responsive to said supplied overflow counts for presenting the number represented by the algebraic summation of said pulses in said train in said standard units of measure, the stages of said adder-subtracter circuit comprising flip-flop logic circuit means having a train of input signal pulses supplied to the input thereof, an input network of interconnected NOT-AND and OR-NOT logic circuit means for supplying to the steering input of the flip-flop logic circuit means said binary signals representative of the value of the conversion factor number to be added or subtracted at a given stage and any carry or borrow values to be processed from adjacent stages, and an output network of interconnected NOT-AND and OR-NOT logic circuit means for deriving any output carry or borrow value signal for supply to adjacent stages.

6. A conversion device for converting a train of interferometer fringe count pulses indicative of a measurement in nonstandard units into a measurement in standard units comprising: a binary coded decimal number reversible counter for storing decimal numbers in decimal number stages thereof, a binary-coded number register, a binary number adder-subtracter, a source of binary signals in parallel form representing the multidigits of a conversion factor number, a source of a serial train of add and subtract pulses, said adder-subtracter responsive to said serial train of pulses and to said binary signals for adding in parallel to or subtracting in parallel from the number stored in said register the conversion factor number represented by said binary signals for each pulse in said train of pulses, said register dimensioned to supply its overflow count in series to the least significant decimal number stage of said counter as a decimal unit incremental input, said counter responsive to said supplied overflow counts for presenting the number represented by the algebraic summation of said pulses in said train in said standard units of measure, only certain of the least significant stages of the adder-subtracter circuit means having adjustable value binary signals supplied thereto and the remaining stages having fixed value binary signals supplied thereto and the stages of the adder-subtracter circuit having the adjustable signals supplied thereto comprise flip-flop logic circuit means having a train of input signal pulses supplied to the input thereof, an input network of interconnected NOT-AND and OR-NOT logic circuit means for supplying to the steering input of the flip-flop logic circuit means binary signals representative of the value of the conversion factor to be added or subtracted at a given stage and any carry or borrow values to be processed from adjacent stages, and an output network of interconnected NOT-AND and OR-NOT logic circuit means for deriving any output carry or borrow value signal for supply to adjacent stages.

UNITED STATES PATENT OFFICE
CERTIFICATE OF CORRECTION

Patent No. 3,602,698 Dated August 31, 1971

Inventor(s) Hervey E. Vigour

It is certified that error appears in the above-identified patent and that said Letters Patent are hereby corrected as shown below:

Column 4, line 2, "$12.67422X10^{16}$" should be -- $12.67422X10^{-6}$ --; Column 4, line 64, "$3.11222X10^{16}$" should be $3.11222X10^{-6}$ --; Column 4, line 73, "$3.11222X10^{16}$" should be -- $3.11222X10^{-6}$ --; Column 5, line 3, "$3.11222X10^{16}$" should be -- $3.11222X10^{-6}$ --; Column 5, line 12, "$(3.11222X10^{6})$" should be -- $(3.11222X10^{-6})$ --; Column 7, line 43, "($B_{out}$ and $B_{out}$)" should be -- ($B_{out}$ and $\overline{B_{out}}$) --; "($C_{out}$ and $C_{out}$)" should be -- ($C_{out}$ and $\overline{C_{out}}$) --; Column 7, line 72, delete "ten" (first occurrence); Column 8, line 46 (Claim 1) "from" should be -- form --.

Signed and sealed this 28th day of March 1972.

(SEAL)
Attest:

EDWARD M.FLETCHER,JR.
Attesting Officer

ROBERT GOTTSCHALK
Commissioner of Patents

PO-1050 (10-69)

USCOMM-DC 60376-P69
☆ U.S. GOVERNMENT PRINTING OFFICE : 1969 O—366-334